United States Patent [19]

Kuznicki

[11] Patent Number: 4,853,202
[45] Date of Patent: Aug. 1, 1989

[54] LARGE-PORED CRYSTALLINE TITANIUM MOLECULAR SIEVE ZEOLITES

[75] Inventor: Steven M. Kuznicki, Easton, Pa.

[73] Assignee: Engelhard Corporation, Edison, N.J.

[21] Appl. No.: 94,237

[22] Filed: Sep. 8, 1987

[51] Int. Cl.⁴ .............................................. C01B 33/24
[52] U.S. Cl. ..................................... 423/326; 423/598
[58] Field of Search ................ 423/326, 331, 332, 598

[56] References Cited

U.S. PATENT DOCUMENTS

| | | | |
|---|---|---|---|
| 3,329,481 | 7/1967 | Young | 208/119 |
| 4,591,576 | 5/1986 | Chiang et al. | 502/65 |
| 4,666,692 | 5/1987 | Taramasso et al. | 423/326 |

FOREIGN PATENT DOCUMENTS 59-184722 10/1984 Japan .................................... 423/326

OTHER PUBLICATIONS

A. N. Mer'kov et al; Zapiski Vses Mineralog. Obshch., pp. 54–62 (1973).
Sandomirskii et al, "The OD Structure of Zorite", Sov. Phys. Crystallogr., 24(6), Nov.–Dec. 1979, pp. 686–693.

*Primary Examiner*—John Doll
*Assistant Examiner*—R. Bruce Breneman
*Attorney, Agent, or Firm*—Inez L. Moselle

[57] ABSTRACT

New crystalline titanium molecular sieve zeolite compositions having a pore size of about 8 Angstrom Units are disclosed together with methods for preparing the same and organic compound conversions.

5 Claims, No Drawings

LARGE-PORED CRYSTALLINE TITANIUM MOLECULAR SIEVE ZEOLITES

BACKGROUND OF THE INVENTION

1. Field of the Invention

This invention relates to new crystalline titanium molecular sieve zeolite compositions, methods for preparing the same and to organic compound conversions therewith, especially hydrocarbon conversions.

2. Background of the Invention and Prior Art

Since the discovery by Milton and coworkers (U.S. Pat. No. 2,882,243 and U.S. Pat. No. 2,882,244) in the late 1950's that aluminosilicate systems could be induced to form uniformly porous, internally charged crystals, analogous to molecular sieves zeolites found in nature, the properties of synthetic aluminosilicate zeolite molecular sieves have formed the basis of numerous commerically important catalytic, adsorptive and ion-exchange applications. This high degree of utility is the result of a unique combination of high surface area and uniform porosity dictated by the "framework" structure of the zeolite crystals coupled with the electrostatically charged sites induced by tetrahedrally coordinated $Al^{+3}$. Thus, a large number of "active" charged sites are readily accessible to molecules of the proper size and geometry for adsorptive or catalytic interactions. Further, since charge compensating cations are electrostatically and not covalently bound to the aluminosilicate framework, they are generally base exchangeable for other cations with different inherent properties. This offers wide latitude for modification of active sites whereby specific adsorbents and catalysts can be tailor-made for a given utility.

In the publication "Zeolite Molecular Sieves", Chapter 2, 1974, D.W. Breck hypothesized that perhaps 1,000 aluminosilicate zeolite framework structures are theoretically possible, but to date only approximately 150 have been identified. While compositional nuances have been described in publications such as U.S. Pat. Nos. 4,524,055, 4,603,040 and 4,606,899, totally new aluminosilicate framework structures are being discovered at a negligible rate. Of particular importance to fundamental progress in the catalysis of relatively large hydrocarbon molecules, especially fluid cracking operations, is the fact that it has been a generation since the discovery of any new large pored aluminosilicate zeolite.

With slow progress in the discovery of new wide pored aluminosilicate based molecular sieves, researchers have taken various approaches to replace aluminum or silicon in zeolite synthesis in the hope of generating either new zeolite-like framework structures or inducing the formation of qualitatively different active sites than are available in analogous aluminosilicate based materials. While progress of academic interest has been made from different approaches, little or no success has been achieved in discovering new wide pore molecular sieve zeolites.

It has been believed for a generation that phosphorus could be incorporated, to varying degrees, in a zeolite type aluminosilicate framework. In the more recent past (JACS 104 pp. 1146 (1982); Proceedings of the 7th International Zeolite Conference, pp. 103-112, 1986) E. M. Flanigan and coworkers have demonstrated the preparation of pure aluminophosphate based molecular sieves of a wide variety of structures. However, the site inducing $Al^{+3}$ is essentially neutralized by the $p^{+5}$, imparting a +1 charge to the framework. Thus, while a new class of "molecular sieves" was created, they are not zeolites in the fundamental sense since they lack "active" charged sites.

Realizing this inherent utility limiting deficiency, for the past few years the research community has emphasized the synthesis of mixed aluminosilicate-metal oxide and mixed aluminophosphate-metal oxide framework systems. While this approach to overcoming the slow progress in aluminosilicate zeolite synthesis has generated approximately 200 new compositions, all of them suffer either from the site removing effect of incorporated $p^{+5}$ or the site diluting effect of incorporating effectively neutral tetrahedral $+4$ metal into an aluminosilicate framework. As a result, extensive research in the research community has failed to demonstrate significant utility for any of these materials.

A series of zeolite-like "framework" silicates have been synthesized, some of which have larger uniform pores than are observed for aluminosilicate zeolites. (W. M. Meier, Proceedings of the 7th International Zeolite Conference, pp. 13-22 (1986).) While this particular synthesis approach produces materials which, by definition, totally lack active, charged sites, back implementation after synthesis would not appear out of the question although little work appears in the open literature on this topic.

Another and most straightforward means of potentially generating new structures or qualitatively different sites than those induced by aluminum would be the direct substitution of some charge inducing species for aluminum in a zeolite-like structure. To date the most notably successful example of this approach appears to be boron in the case of ZSM-5 analogs, although iron has also been claimed in similar materials. (EPA 68,796 (1983), Taramasso et al; Proceedings of the 5th International Zeolite Conference; pp. 40-48 (1980)); J. W. Ball et al; Proceedings of the 7th International Zeolite Conference; pp. 137-144 (1986); U.S. Pat. No. 4,280,305 to Kouenhowen et al. Unfortunately, the low levels of incorporation of the species substituting for aluminum usually leaves doubt if the species are occluded or framework incorporated.

In 1967, Young in U.S. Pat. No. 3,329,481 reported that the synthesis of charge bearing (exchangeable) titaniumsilicates under conditions similar to aluminosilicate zeolite formation was possible if the titanium was present as a "critical reagent" $+III$ peroxo species. While these materials were called "titanium zeolites" no evidence was presented beyond some questionable X-ray diffraction (XRD) patterns and his claim has generally been dismmised by the zeolite research community. (D. W. Breck, Zeolite Molecular Sieves, p. 322 (1974); R. M. Barrer, Hydrothermal Chemistry of Zeolites, p. 293 (1982); G. Perego et al, Proceedings of 7th International Zeolite Conference, p. 129 (1986).) For all but one end member of this series of materials (denoted TS materials), the presented XRD patterns indicate phases too dense to be molecular sieves. In the case of the one questionable end member (denoted TS-26), the XRD pattern might possible be interpreted as a small pored zeolite, although without additional supporting evidence, it appears extremely questionable.

A naturally occurring alkaline titanosilicate identified as "Zorite" was discovered in trace quantities on the Siberian Tundra in 1972 (A. N. Mer'kov et al; Zapiski Vses Mineralog. Obshch., pages 54-62 (1973)). The published XRD pattern was challenged and a proposed structure reported in a later article entitled "The OD Structure of Zorite", Sandomirskii et al, Sov. Phys. Crystallogr. 24 (6), Nov-Dec 1979, pages 686-693.

No further reports on "titanium zeolites" appeared in the open literature until 1983 when trace levels of tetrahedral Ti(IV) were reported in a ZSM-5 analog. (M. Taramasso et al; U.S. Pat. No. 4,410,501 (1983); G. Perego et al., Proceedings of the 7th International Zeolite Conference; p. 129 (1986).) A similar claim appeared from researchers in mid-1985 (EPA 132,550 (1985).) More recently, the reserach community reported mixed aluminosilicate-titanium(IV) (EPA 179,876 (1985); EPA 181,884 (1985) structures which, along with TAPO (EPA 121,232 (1985) systems, appear to have no possibility of active titanium sites. As such, their utility is highly questionable.

That charge bearing, exchangeable titanium silicates are possible is inferred not only from the existence of exchangeable alkali titanates and the early work disclosed in U.S. Pat. No. 3,329,481 on ill defined titaniumsilicates but also from the observation (S. M. Kuznicki et al; J. Phys. Chem.; 84; pp. 535-537 (1980)) of $TiO_4$-units in some modified zeolites.

SUMMARY OF THE INVENTION

The present invention relates to a new family of stable, large pore crystalline titaniumsilicate molecular sieve zeolites, hereinafter designated ETS, their method of preparation and the use of such compositions as adsorbents and catalysts for the conversion of a wide variety of organic compounds, e.g., hydrocarbon compounds and oxygenates such as methanol.

DETAILED DESCRIPTION OF THE INVENTION

The present invention relates to a new family of stable crystalline titaniumsilicate molecular sieve zeolites which have a pore size of approximately 8° Angstrom units and a titania/silica mole ratio in the range of from 2.5 to 25. These titanium silicates have a definite X-ray diffraction pattern unlike other molecular sieve zeolites and can be identified in terms of mole ratios of oxides as follows:

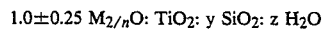

$1.0 \pm 0.25\ M_{2/n}O: TiO_2: y\ SiO_2: z\ H_2O$ wherein M is at least one cation having a valence of n, y is from 2.5 to 25, and z is from 0 to 100. In a preferred embodiment, M is a mixture of alkali metal cations, particularly sodium and potassium, and y is at least 3.5 and ranges up to about 10.

The original cations M can be replaced at least in part with other cations by well known exchange techniques. Preferred replacing cations include hydrogen, ammonium rare earth, and mixtures thereof. Members of the family of molecular sieve zeolites designated ETS in the rare earth-exchanged form have a high degree of thermal stability of at least 450° C. or higher, thus rendering them effective for use in high temperature catalytic processes. ETS zeolites are highly adsorptive toward molecules up to approximately 8 Angstroms in critical diameter, e.g., triethylamine, and are essentially non-adsorptive toward molecules such as 1,3,5-trimethylbenzene, which is at least 8 Angstroms in minimum dimension. In the sodium form, ETS is completely reversibly dehydratable with a water capacity of approximately 20 weight percent.

Members of the ETS molecular sieve zeolites have a crystalline structure and an X-ray powder diffraction pattern having the following significant lines:

TABLE 1

| XRD POWDER PATTERN OF ETS-10 (0–40° 2 theta) | |
|---|---|
| SIGNIFICANT d-SPACING (ANGS.) | $I/I_o$ |
| 14.7 ± .35 | W-M |
| 7.20 ± .15 | W-M |
| 4.41 ± .10 | W-M |
| 3.60 ± .05 | VS |
| 3.28 ± .05 | W-M |
| In the above table, | |
| VS = 60–100 | |
| S = 40–60 | |
| M = 20–40 | |
| W = 5–20 | |

The above values were determined by standard techniques. The radiation was the K-alpha doublet of copper, and a scintillation counter spectrometer was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d (obs.), the interplanar spacing in A, corresponding to the recorded lines, were calculated. It should be understood that this X-ray diffraction pattern is characteristic of all the species of ETS compositions. Ion exchange of the sodium ion and potassium ions with cations reveals substantially the same pattern with some minor shifts in interplanar spacing and variation in relative intensity. Other minor variations can occur depending on the silicon to titanium ratio of the particular sample, as well as if it had been subjected to thermal treatment. Various cation exchanged forms of ETS have been prepared and their X-ray powder diffraction patterns contain the most significant lines set forth in Table 1.

ETS molecular sieve zeolites can be prepared from a reaction mixture containing a titanium source such a titanium trichloride, a source of silica, a source of alkalinity such as an alkali metal hydroxide, water and, optionally, an alkali metal fluoride having a composition in terms of mole ratios falling within the following ranges.

TABLE 2

| | Broad | Preferred | Most Preferred |
|---|---|---|---|
| $SiO_2/Ti$ | 2–20 | 3–10 | 4–7 |
| $H_2O/SiO_2$ | 2–100 | 5–50 | 10–25 |
| $Mn/SiO_2$ | 0.1–10 | .5–5 | 1–3 | wherein M indicates the cations of valence n derived from the alkali metal hydroxide and potassium fluoride and/or alkali metal salts used for preparing the titanium silicate according to the invention. The reaction mixture is heated to a temperature of from about 100° C. to 200° C. for a period of time ranging from about 8 hours to 40 days, or more. The hydrothermal reaction is carried out until crystals are formed and the resulting crystalline product is thereafter separated from the reaction mixture, cooled to room temperature, filtered and water washed. The reaction mixture can be stirred although it is not necessary. It has been found that when using gels, stirring is unnecessary but can be employed. When using sources of titanium which are solids, stirring is beneficial. The preferred temperature range is 100° C. to 175° C. for a period of time ranging from 12 hours to 15 days. Crystallization is performed in a continuous or batchwise manner under autogeneous pressure in an autoclave or static bomb reactor. Following the water washing step, the crystalline ETS is dried at temperatures of 100° to 400° F. for periods up to 30 hours.

The method of preparing ETS compositions comprises the preparation of a reaction mixture constituted by sources of silica, sources of titanium, sources of alkalinity such as sodium and/or potassium oxide and water having a reagent molar ratio composition as set forth in Table 2. Optionally, sources of fluoride such as potassium fluoride can be used, particularly to assist in solubilizing a solid titanium source such as $Ti_2O_3$. However, when titanium silicates are prepared from gels, its value is greatly diminished.

The silica source includes most any reactive source of silicon such as silica, silica hydrosol, silica gel, silicic acid, alkoxides of silicon, alkali metal silicates, preferably sodium or potassium, or mixtures of the foregoing.

The titanium oxide source is a trivalent compound such as titanium trichloride, $TiCl_3$.

The source of alkalinity is preferably an aqueous solution of an alkali metal hydroxide, such as sodium hydroxide, which provides a source of alkali metal ions for maintaining electrovalent neutrality and controlling the pH of the reaction mixture within the range of 9.9 to 10.3±0.1. As shown in the examples hereinafter, pH is critical for the production of ETS. The alkali metal hydroxide serves as a source of sodium oxide which can also be supplied by an aqueous solution of sodium silicate.

It is to be noted that at the higher end of the pH range, a mixture of titanium zeolites tends to form while at the lower end of the pH range, quartz appears as an impurity.

The titanium silicate molecular sieve zeolites prepared according to the invention contain no deliberately added alumina, and may contain very minor amounts of $Al_2O_3$ due to the presence of impurity levels in the reagents employed, e.g., sodium silicate, and in the reaction equipment, The molar ratio of $SiO_2/Al_2O_3$ will be 0 or higher than 500 or more.

The crystalline titanium silicate as synthesized can have the original components thereof replaced by a wide variety of others according to techniques well known in the art. Typical replacing components would include hydrogen, ammonium, alkyal ammonium and aryl ammonium and metals, including mixtures of the same. The hydrogen form may be prepared, for example, by substitution of original sodium with ammonium, The composition is then calcined at a temperature of, say, 1000° F. causing evolution of ammonia and retention of hydrogen in the composition, i.e., hydrogen and/or decationized form. Of the replacing metals, preference is accorded to metals of Groups II, IV and VIII of the Periodic Table, preferably the rare earth metals.

It has been found that a special calcination procedure must be used to convert the ammonium form to the hydrogen form and maintain its stability. The calcination can be described as a "shock" calcination because the $NH_3$ exchanged zeolite is rapidly heated to temperatures in excess of about 400° C. Temperature profiles of at least about 20° C./min are satisfactory.

Another method comprises depositing the ammonium form on a pre-heated silica tray in an oven at 500° C. for about 30 minutes.

The crystalline titanium silicates are then preferably washed with water and dried at a temperature ranging from 150° F. to about 600° F. and thereafter calcined in air or other inert gas at temperatures ranging from 500° F. to 1500° F. for periods of time ranging from 1 to 48 hours or more.

Regardless of the synthesized form of the titanium silicate the spatial arrangement of atoms which form the basic crystal lattices remain essentially unchanged by the replacement or sodium or other alkali metal or by the presence in the initial reaction mixture of metals in addition to sodium, as determined by an X-ray powder diffraction pattern of the resulting titanium silicate. The X-ray diffraction patterns of such products are essentially the same as those set forth in Table I above.

The crystalline titanium silicates prepared in accordance with the invention are formed in a wide variety of particular sizes. Generally, the particles can be in the form of powder, a granule, or a molded product such as an extrudate having a particle size sufficient to pass through a 2 mesh (Tyler) screen and be maintained on a 400 mesh (Tyler) screen in cases where the catalyst is molded such as by extrusion. The titanium silicate can be extruded before drying or dried or partially dried and then extruded.

When used as a catalyst, it is desired to incorporate the new crystalline titanium silicate with another material resistant to the temperatures and other conditions employed in organic processes. Such materials include active and inactive materials and synthetic and naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the new crystalline titanium silicate, i.e., combined therewith which is active, tends to improve the conversion and/or selectivity of the catalyst in certain organic conversion processes. Inactive materials suitably serve as diluents to control the amount of conversion in a given process so that products can be obtained economically and in an orderly manner without employing other means for controlling the rate of reaction. Normally, crystalline materials have been incorporated into naturally occurring clays, e.g., bentonite and kaolin to improve th crush strength of the catalyst under commerical operating conditions. These materials, i.e., clays, oxides, etc., function as binders for the catalyst. It is desirable to provide a catalyst having good crush strength because in a petroleum refinery the catalyst is often subjected to rough handling which tends to break the catalyst down into powder-like materials which cause problems in processing. These clay binders have been employed for the purpose of improving the crush strength of the catalyst.

Naturally occurring clays that can be composited with the crystalline titanium silicate described herein include the smectite and kaoline families, which families include the montmorillonites such as sub-bentonites and the kaolins known commonly as Dixie, McNamee, Ga. and Florida or others in which the main constituent is halloysite, kaolinite, dickite, nacrite or anauxite. Such clays can be used in the raw state as originally mined or initially subjected to calcination, acid treatment or chemical modification.

In addition to the foregoing materials, the crystalline titanium silicate may be composited with matrix materials such as silica-alumina, silica-magnesia, silica-zirconia, silica-thoria, silica-berylia, silica-titania as well as ternary compositions such as silica-alumina-thoria, silica-alumina-zirconia, silica-alumina-magnesia and silica-magnesia-zirconia. The matrix can be in the form of a cogel. The relative proportions of finally divided crystalline metal organosilicate and inorganic oxide gel matrix can vary widely with the crystalline organosilicate content ranging from about 1 to 90 percent by weight and more usually in the range of about 2 to to about 50 percent by weight of the composite.

As is known in the art, it is desirable to limit the alkali metal content of materials used for acid catalyzed reactions. This is usually accomplished by ion exchange with hydrogen ions or precursors thereof such as ammonium and/or metal cations such as rare earth.

Employing the catalyst of this invention, containing a hydrogenation component, heavy petroleum residual stocks, cycle stocks, and other hydrocrackable charge stocks can be hydrocracked at temperatures between 400° F. and 825° F. using molar ratios of hydrogen to hydrocarbon charge in the range between 2 and 80. The pressure employed will vary between 10 and 2,500 psig and the liquid hourly space velocity between 0.1 and 10.

Employing the catalyst of this invention for catalytic cracking, hydrocarbon cracking stocks can be cracked at a liquid hourly space velocity between about 0.5 and 50, a temperature between about 550° F. and 1100° F., a pressure between about subatmospheric and several hundred atmospheres.

Employing a catalytically active form of a member of the family of zeolites of this invention containing a hydrogenation component, reforming stocks can be reformed employing a temperature between 700° F. and 1000° F. The pressure can be between 100 and 1,000 psig, but is preferably between 200 to 700 psig. The liquid hourly space velocity is generally between 0.1 and 10, preferably between 0.5 and 4 and the hydrogen to hydrocarbon mole ratio is generally between 1 and 20, preferably between 4 and 12.

The catalyst can also be used for hydroisomerization of normal paraffins when provided with a hydrogenation component, e.g., platinum. Hydroisomerization is carried out at a temperature between 200° and 700° F., preferably 300° F. to 550° F., with a liquid hourly space velocity between 0.01 and 2, preferably between 0.25 and 0.50 employing hydrogen such that the hydrogen to hydrocarbon mole ratio is between 1:1 and 5:1. Additionally, the catalyst can be used for olefin isomerization employing temperatures between 30° F. and 500° F.

In order to more fully illustrate the nature of the invention and a manner of practicing the same, the following examples illustrate the best mode now contemplated.

Examples 1-3 represent runs outside the scope of this invention serving to illustrate the criticality of pH.

Because of the difficulty of measuring pH during crystallization, it is to be understood that the term pH as used in the specification and claims refers to the pH of the reaction mixture before crystallization diluted 100:1 by volume with water and equilibrated for periods of time ranging from 1-10 minutes.

| | |
|---|---|
| 10.40 | grams of sodium silicate (28.7% $SiO_2$, 8.9% $Na_2O$) |
| 3.55 | grams of titaniumsesquioxide ($Ti_2O_3$) |
| 9.00 | grams NaOH |
| 4.20 | grams KOH |
| 4.70 | grams $KF \cdot 2H_2O$ |

| -continued | |
|---|---|
| Additional water added to a total of 54.0 grams | |
| Such that: | Ti/Si = 1 |
| | Na+K/Si = 3 |
| | $[OH]^-$/Si = 3 |
| | $H_2O$/Si = 60 |
| | $[OH]^-$/$H_2O$ = 10 |

After bending, the $Ti_2O_3$ appeared insoluble and settled from the solution, no titanium-silicate gel complex being evident. The pH at this point was 12.2±0.1.

After autoclaving under autogenous pressure for 7 days at 125° C., a clearly crystalline phase (dubbed ETS-1) was observed. Attempts at shorter reaction times resulted in only partially crystalline phases. This phase demonstrated the following X-ray (XRD) powder pattern:

| d-spacing (Å) | $I/I_o$ |
|---|---|
| 7.80 | 100 |
| 7.16 | 5 |
| 4.69 | 5 |
| 4.47 | 5 |
| 3.90 | 15 |
| 3.39 | 5 |
| 3.20 | 30 |
| 3.03 | 5 |
| 2.60 | 35 |
| 2.45 | 15 |
| 2.38 | 10 |
| 1.97 | 10 |
| 1.95 | 20 |
| 1.90 | 15 |

While the products produced by Young (U.S. Pat. No. 3,329,481) were claimed to be amorphous or of poor crystallinity, it should be noted that the two largest XRD peaks reported by Young for a material dubbed TS-26 are circa 7.8A and 3.2A consistent with the first and third strongest peaks. While significant differences exist, product elemental composition is identical (within experimental error) with that reported for TS-26 (Ti/Si slightly greater than 1. It is probably that XRD differences represent contaminants in Young's "poorly crystalline" sample and that the material represented in Example 1 represents a pure, highly crystalline form of TS-26.

TS-26 is important in that the XRD pattern is the only of Young's "titanium zeolites" which demonstrates d-spacings large enough to be a zeolite, albeit small pored. This material, while exchangeable, is of low thermal stability and the series of apparent plainer reflections in the XRD pattern (strongest peak by far is the lead peak at 7.8A, 7.8/2=3.9 where a strong peak is noted, 7.8/3=2.6 where a strong peak is noted and 7.8/4=1.95 where a strong peak is noted) all are consistent with a layered titanate. No molecular sieving has been noted for this material or demonstrated for TS-26 by Young.

EXAMPLE 2

The experiment of Example 1 was repeated but with aqueous $TiCl_3$ utilized as the titanium source. Additional caustic as sodium and/or potassium hydroxide was added to the silica source prior to the addition of titanous chloride to compensate for the acid used to stabilize said titanous chloride. The pH was the same as Example 1.

Upon mixing in a Waring blender, a deep purple, apparently homogeneous titanium-silicate get formed which upon autoclaving for 1 day to 125° C. resulted in a highly crystalline product essentially identical to that of Example 1. Owing to either the greater dispersion of titanium or the preformation of a titanium-silicate complex, reaction proceeded at a significantly accelerated rate versus the employment of the sparingly soluble titanium ($Ti_2O_3$) source of Example 1.

EXAMPLE 3

Example 1 was repeated with the exception that potassium was removed from the system by substituting 12 grams of NaOH for the previously employed 9 grams of NaOH+4.2 grams of KOH and 4.2 grams of NaF was substituted for the 4.7 grams of $KF.2H_2O$. The pH was 12.2±1. After autoclaving as specified in Example 1, a crystalline product was obtained with 3 strong XRD peaks in the region of 2 theta=2.40°.

| d-spacing | $I/I_o$ |
|---|---|
| 8.75 | 85 |
| 3.70 | 40 |
| 3.16 | 100 |

This material dubbed ETS-2 essentially devoid of silica, while possessing larger d-spacings than ETS-1/TS-26, demonstrates the broad peaks, a few in number, which are characteristic of a layered structure. The material produced by this example demonstrates low thermal stability, exchange behavior and lack of noted molecular sieving properties which are very similar to ETS-1/TS-26.

CONCLUSIONS FROM EXAMPLES 1-3

(1) The materials disclosed by Young as "titanium zeolites" are most prbably layered titanates and not molecular sieves; (2) such materials may in fact be produced without the "critical reagent" previously required and in some cases do not even require the preparation of a titanium-silicate gel, but (3) titanium silicate gals significantly accelerate the formation of these materials; and (4) appropriate gels may easily be prepared by the precipitation of octahedrally coordinated titanium in basic silica solutions (such that the total base more than neutralizes the acid present in titanium reagents) using common titanium sources such as aqueous titanous chloride. The pH in all cases is extremely high relative to that used in the instant system.

EXAMPLE 4

This example will illustrate the preparation of a small pored titanium silicate molecular sieve.

| | |
|---|---|
| 62.8 | grams of sodium silicate (28.7% $SiO_2$, 8.9% $Na_2O$) |
| 40.8 | grams 20% $TiCl_3$ solution (also 20% in HCL) |
| 11.4 | grams NaOH (added to sodium silicate) |
| 9.4 | grams $KF.2H_2O$ |
| Such that: | Si/Ti = approximately 5.67 |
| | Na+K/Si = approximately 1.88 |
| | Initial $[OH]^-$/Si = approximately 0.2 |
| | Calculated $[OH]^-$/Si = approximately 0.2 |
| | $H_2O$/Si = approximately 60 |

The pH was 10.45 ± .1.

Autoclaving without stirring under autogenous pressure at 150° C. for 7 days resulted in the formation of a highly crystalline phase dubbed ETS-4 (where Si/Ti=approximately 2.6 and Na+K/Ti=1.5–2.0). Whose XRD pattern is represented by:

| d-spacing | $I/I_o$ |
|---|---|
| 11.6 | 45 |
| 6.9 | 95 |
| 5.27 | 35 |
| 4.45 | 25 |
| 3.61 | 25 |
| 3.45 | 50 |
| 3.38 | 35 |
| 3.066 | 95 |
| 2.979 | 100 |
| 2.902 | 55 |
| 2.763 | 20 |
| 2.641 | 25 |
| 2.587 | 60 |
| 2.506 | 10 |
| 2.426 | 20 |

This material, ETS-4, is described in copending application, Ser. No. 094,233, filed Sept. 8, 1987, the disclosure of which is incorporated by reference. (Attorney Docket ENG-87-13.)

EXAMPLE 5

This example illustrates this invention. The mixture of Example 4 was duplicated with the exception that the added base was reduced to 8.95 grams (calculated to exactly compensate for the HCL stabilizing the aqueous titanous chloride) and the alkalinity of the mixture was solely due to that inherent from the sodium silicate. 1.23 grams of ETS-4 (Example 4) was added as seeds to stimulate the growth of crystalline species and the overall mxiture's pH was approximately 10.2±.2. Upon reacting the mixture under conditions identical to Example 4, a new phase dubbed ETS-10 was observed which represents a large pored (8A), siliceous (Si/Ti=approximately (5) titanium-silicate classical molecular sieve whose XRD pattern is represented by:

| d-spacing | $I/I_o$ |
|---|---|
| 14.7 | 15 |
| 7.2 | 10 |
| 4.93 | 5 |
| 4.41 | 25 |
| 3.74 | 5 |
| 3.60 | 100 |
| 3.45 | 25 |
| 3.28 | 20 |
| 2.544 | 10 |
| 2.522 | 25 |
| 2.469 | 10 |

The above material had the following composition.

| | |
|---|---|
| $SiO_2$ | 63.5 wt. % |
| $TiO_2$ | 17.8 wt. % |
| $Na_2O$ | 11.4 wt. % |
| $K_2O$ | 5.0 wt. % |
| Si/Ti ratio = 4.75 | |
| Cationic charge/Ti = 2.1 | |

Numerous attempts to prepare titanium-silicate molecular sieves under acidic mixture conditions, even extremely mild, have failed to produce any encouraging crystalline phases.

EXAMPLE 6

The process of Example 5 is repeated but without the addition of potassium fluoride. A crystalline product is obtained having the XRD of Example 5.

EXAMPLE 7

The following reactants were blended:
269.7 grams of SDS* (sodium disilicate)
1.63.2 grams of $TiCl_3$ (20% HCl)
18.7 grams of NAOH
37.6 grams of $KF.2H_2O$
22.0 grams of NACl
(*14 wt.% $Na_2O$; 26. wt.% $SiO_2$; Bal $H_2O$)
The pH of the blended reactants was 10.1

After autoclaving for 6 days as 175° C. under autogenous pressure, a crystalline titanium silicate zeolite having the following XRD was obtained:

| d-spacing | $I/I_o$ |
| --- | --- |
| 14.6 | 10 |
| 7.21 | 10 |
| 4.94 | <5 |
| 4.41 | 28 |
| 3.74 | <5 |
| 3.60 | 100 |
| 3.45 | 23 |
| 3.28 | 22 |
| 2.542 | 10 |
| 2.520 | 20 |
| 2.467 | 9 |

This material was identical to that of Example 5.

EXAMPLE 8

The process of Example 7 was repeated with the exception that the silica source was a silica sol marketed under the tradename LUDUX ® HS-40 by E.I. duPont deNemours & Co. Although some crystalline material was obtained having the same XRD as Example 7, the predominant product is Quartz.

EXAMPLE 9

The following reactants were blended:
126. grams sodium silicate (same as Example 4)
81.6 grams 20% $TiCl_3$ solution (also 20% HCl)
17.8 grams NaOH
8.4 grams NaF
11.0 grams NaCl
24 ml $H_2O$
The pH of the reaction mixture was 10.16.

After autoclaving for 9 days at 175° C. at autogenous pressure, a crystalline titanium silicate zeolite was obtained having the following XRD:

| d-spacing | $I/I_o$ |
| --- | --- |
| 14.66 | 13 |
| 7.22 | 10 |
| 4.92 | <5 |
| 4.40 | 30 |
| 3.74 | <5 |
| 3.60 | 100 |
| 3.47 | 25 |
| 3.28 | 21 |
| 3.536 | 13 |
| 2.519 | 23 |
| 2.463 | 15 |

This material was idential to that of Example 5.

EXAMPLE 10

A sample of as-synthesized NA/K ETS, e.g., Example 7 was exchanged such that a preponderance of its original cationic content was replaced by repeated treatment with an aqueous solution of ammonium nitrate. The ammonium form was converted to the hydrogen form by deposition of the material onto a preheated silica tray in an oven at 500° C. for ½ hour.

The following are the XRD for both the ammonium form and hydrogen form.

TABLE 3

| $NH_3$ ETS | | H ETS | |
| --- | --- | --- | --- |
| d-spacing | $I/I_o$ | d-spacing | $I/I_o$ |
| 14.58 | 35 | 14.60 | 17 |
| 7.16 | 26 | 7.17 | 35 |
| 4.91 | <3 | 4.90 | <5 |
| 4.41 | 35 | 4.40 | 39 |
| 3.74 | 0 | 3.74 | 0 |
| 3.58 | 100 | 3.59 | 100 |
| 3.45 | 28 | 3.44 | 34 |
| 3.29 | 20 | 3.27 | 22 |
| 2.52 | 22 | 2.52 | 20 |
| 2.456 | 8 | 2.456 | 9 |

As can be seen from the above Table, the hydrogen form retained its crystallinity.

EXAMPLE 11

Sorption measurements were carried out on various cationic forms of ETS.

The procedure involved activating a particular sample at elevated temperatures under vacuum for at least 2 hours. The sample was allowed to cool to room temperature and exposed to a potential sorbate at about 20 mm pressure. Sorption measurements were done on a McBain-Bakr balance. The following results were obtained.

| Sorbate | As-Synthesized | RE ETS | H ETS |
| --- | --- | --- | --- |
| $H_2O$ | 12.9 wt. % | 12.6 | 15 wt. % |
| n-hexane | 8.2 | 7.2 | 7.8 |
| 1,3,5-trimethylbenzene | .4–.5 | .4–.5 | .4–.5 |
| triethylamine | 8.4 | 4.7 | 11.1 |

From the above and other tests, the pore size of the novel materials of this invention is about 8 Angstroms.

What is claimed is:

1. A crystalline titaniumsilicate molecular sieve zeolite having a pore size of approximately 8 Angstrom units and a composition in terms of mole ratios of oxides as follows:

$$1.0 \pm 0.25 \, M_{2/n}O: TiO_2: y \, SiO_2: z \, H_2O$$

wherein M is at least one cation having a valence of n, y is from 2.5 to 25, and z is from 0 to 100, said zeolite being characterized by an X-ray powder diffraction pattern having the lines and relative intensities set forth in Table I of the specification.

2. The zeolite of claim 1 wherein y is 3.5 to 10.

3. The zeolite of claim 1 wherein M is a mixture of sodium and potassium.

4. The zeolite of claim 1 wherein at least a portion of M is hydrogen.

5. The zeolite of claim 1 wherein at least a portion of M is rare earth.

* * * * *